US010002611B1

(12) United States Patent
Typrin

(10) Patent No.: US 10,002,611 B1
(45) Date of Patent: Jun. 19, 2018

(54) ASYNCHRONOUS AUDIO MESSAGING

(71) Applicant: Amazon Technologies, Inc., Seattle, WA (US)

(72) Inventor: Marcello Typrin, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 13/895,007

(22) Filed: May 15, 2013

(51) Int. Cl.
*G10L 15/26* (2006.01)

(52) U.S. Cl.
CPC .................. *G10L 15/26* (2013.01)

(58) Field of Classification Search
None
See application file for complete search history.

(56) References Cited

U.S. PATENT DOCUMENTS

| 7,418,392 B1 | 8/2008 | Mozer et al. | |
|---|---|---|---|
| 7,720,683 B1 | 5/2010 | Vermeulen et al. | |
| 7,774,204 B2 | 8/2010 | Mozer et al. | |
| 8,488,764 B1 * | 7/2013 | Swartz | H04M 3/565 370/261 |
| 2009/0177300 A1 * | 7/2009 | Lee | G11B 20/10527 700/94 |
| 2009/0197617 A1 * | 8/2009 | Jayanthi | G01C 21/3438 455/456.2 |
| 2009/0276215 A1 * | 11/2009 | Hager | G06F 17/273 704/235 |
| 2012/0022872 A1 * | 1/2012 | Gruber | G06F 17/279 704/270.1 |
| 2012/0101818 A1 * | 4/2012 | Scott | G06Q 10/109 704/231 |
| 2012/0223885 A1 | 9/2012 | Perez | |
| 2013/0332162 A1 * | 12/2013 | Keen | G10L 15/26 704/235 |
| 2014/0372115 A1 * | 12/2014 | LeBeau | H04M 1/72552 704/235 |

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

Primary Examiner — Richa Mishra
(74) Attorney, Agent, or Firm — Lee & Hayes, PLLC

(57) ABSTRACT

Systems, devices, and techniques may provide asynchronous audio messaging. Asynchronous audio messaging may enable a user to quickly and easily create and transmit a message to a recipient. The user may simply record a message for a recipient. The message may include an indication of the recipient of the message, an action (e.g., to send a message, etc.) and/or other types of information. A messaging module may modify the message to create a modified version of the message and then generate an additional version of the modified message in a different media type. The modified message and the addition version of the modified message may be transmitted to the recipient. In some embodiments, the messaging module may transmit other information such as location information, an expiration, or other information derived from the message to enhance the message.

22 Claims, 9 Drawing Sheets

ASYNCHRONOUS AUDIO MESSAGING

BACKGROUND

Homes, offices, and public spaces are becoming more wired and connected with the proliferation of computing devices such as notebook computers, tablets, entertainment systems, and portable communication devices. As computing devices evolve, the way in which users interact with these devices continues to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture human speech and other sounds using microphones. When interacting with a computing device using speech, the computing device may perform automatic speech recognition (ASR) on audio signals generated from sound captured within an environment for the purpose of identifying voice commands within the signals.

Traditional text messaging systems remain popular despite many limitations imposed by these systems. For example, text messages take time to compose using a physical or virtual keyboard and require multiple steps to send the messages to a recipient. To transmit a message, a user typically has to open an application, select a recipient, draft a message for the recipient, and then select a send command to cause transmission of the message. These steps may be difficult to perform when a user is moving or performing other tasks at the same time.

Voice communications are often limited to synchronous communications where the communications occur in real time and to voicemail communications. When using conventional voicemail communications, users often spend an unnecessarily long amount of time to obtain a stored voicemail message because a user typically has to call a voicemail service and then listen to instructions, commands, or other announcements prior to listening to the voicemail. Thus, exchanging messages using voicemail is often impractical and disfavored by many users due to the amount of time required to retrieve the voicemail. In addition, the voicemail typically does not include any additional information that may help a user understand a context of the message.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
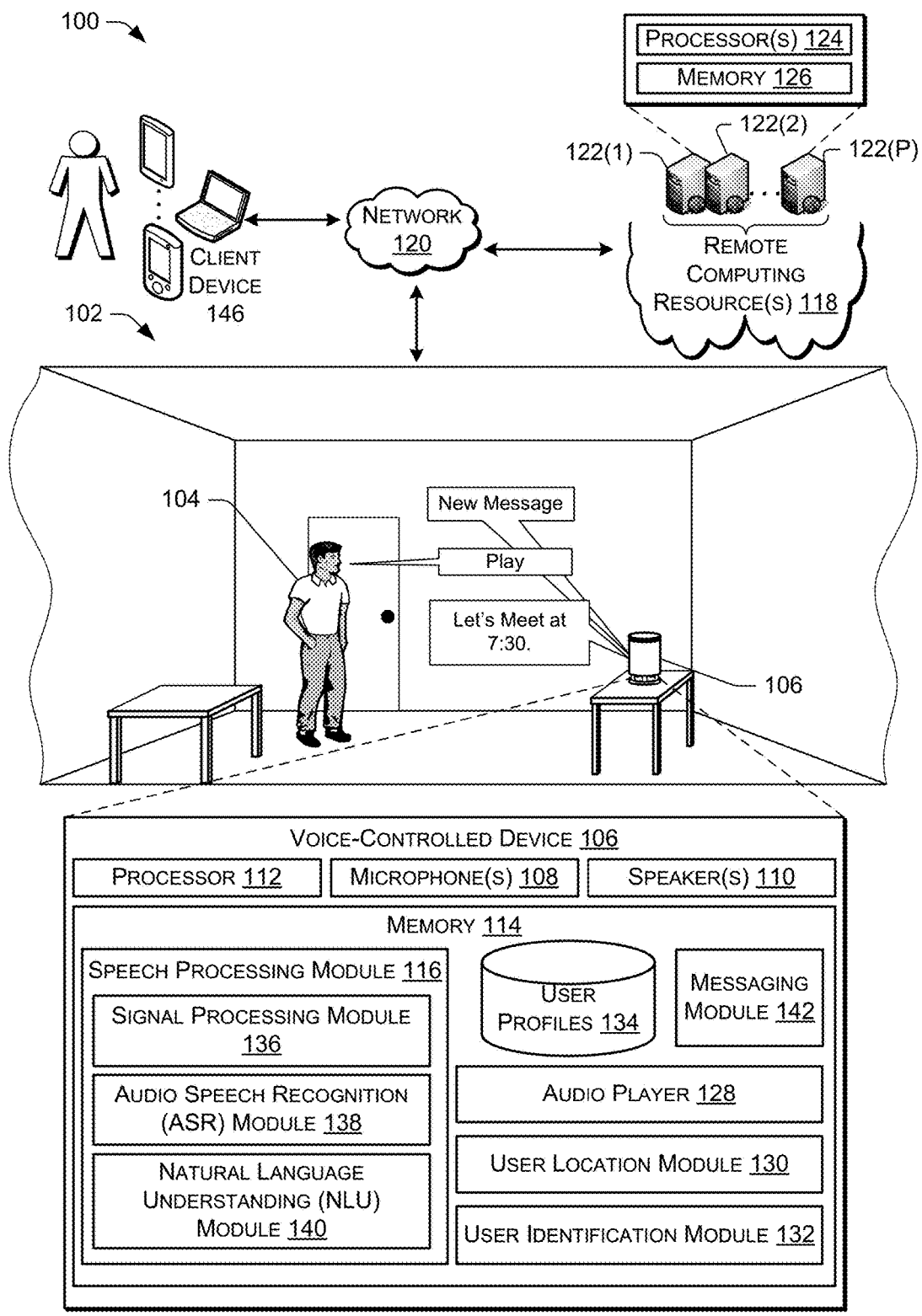
FIG. 1 is a schematic diagram of an illustrative voice interaction computing architecture that includes a voice-controlled device situated in an environment.

This disclosure generally pertains to systems, devices, and techniques to provide asynchronous audio messaging. Asynchronous audio messaging may enable a user to quickly and easily create and transmit a message to a recipient. For example, the user may simply record audio that includes a message for a recipient by speaking into or near a microphone. The audio may include an indication of the recipient of the message, an action (e.g., to send a message, etc.) and/or other types of information.

For example, while an audio device is listening (e.g., powered on, recording, etc.), a user may speak "send Bob a message that I will be at his house in 30 minutes," which may be captured as audio by a microphone of the audio device. An asynchronous audio messaging system may perform speech recognition on the audio to determine a command from the audio, such as a command to "send a message," and a recipient, such as "Bob." The asynchronous audio messaging system may determine a message (payload) and may create a text version of the message. The asynchronous audio messaging system may then transmit the message, which is an audio message, and the text version of the message to the recipient without any further activity by the user. In some instances, the message may be a truncated version of the audio that omits the command and the recipient. In some embodiments, the asynchronous audio messaging system may request confirmation by the user of one or more details prior to transmitting the message, such as to verify the recipient, verify the recipient's electronic address or communication mode, and/or verify other information.

In various embodiments, a device may receive a text message and then create an audio message based at least in part on the text message. The device may transmit the text message and the audio message to a designated recipient device. The designated recipient device may then present the text message and the audio message in a user interface that allows convenience access to the messages and other related messages.

In some embodiments, the asynchronous audio messaging system may extract additional information from the audio and/or otherwise enhance the message with additional contextual information. For example, the asynchronous audio messaging system may identify an expiration of the message, send a reminder to a recipient of the message if a response to the message has not been received from the recipient, combine the message with another message, update the message based on subsequent events, provide location information about the user, and/or provide other contextual information. The asynchronous audio messaging system may be deployed in an automobile, a watch, a pair of glasses, and/or other mobile or stationary devices that enable ease of access and often do not accommodate traditional textual input during at least part of the operation of the device (e.g., while walking or driving a car, etc.).

The techniques and systems described herein may be implemented in a number of ways. Example implementations are provided below with reference to the following figures.

FIG. 1 shows an illustrative voice interaction computing architecture 100 set in an environment 102, such as a home environment, that includes a user 104. The architecture 100 also includes an electronic voice-controlled device 106 (interchangeably referred to as "device 106") with which the user 104 may interact. In the illustrated implementation, the voice-controlled device 106 is positioned on a table within a room of the environment 102. In other implementations, it may be placed in any number of locations (e.g., ceiling, wall, in a lamp, beneath a table, under a chair, etc.). Further, more than one device 106 may be positioned in a single room, or one device 106 may be used to accommodate user interactions from more than one room.

Generally, the voice-controlled device 106 may have a microphone unit that includes multiple microphones 108 and a speaker unit that includes at least one speaker 110 to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2A.

The microphone(s) 108 of the voice-controlled device 106 may detect audio (e.g. audio signals) from the environment 102, such as sounds uttered from the user 104, other noise within the environment 102. As illustrated, the voice-controlled device 106 may include a processor 112 and memory 114, which stores or otherwise has access to a speech processing module 116. As used herein, the processor 112 may include multiple processors and/or a processor having multiple cores. The speech processing module 116 may perform signal processing (e.g., beamforming, to remove noise and/or echo, etc.) and/or speech recognition on audio signals generated by the microphone(s) 108, with these signals being generated from sound within the environment 102, such as utterances spoken by the user 104. The voice-controlled device 106 may perform certain actions in response to recognizing different speech from the user 104. The user 104 may speak predefined commands (e.g., "Awake", "Sleep", etc.), or may use a more casual conversation style when interacting with the device 106 (e.g., "Ask Jenny if she needs anything while I'm at the grocery store."). The speech processing module 116 may also perform natural language understanding to extract meaning and information from the audio, often by analysis of the text generated from the audio.

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors 112, storage, software, data access, and so forth that is maintained and accessible via a network 120 such as the Internet. The remote computing resources 118 may not require end-user knowledge of the physical location and configuration of the system that delivers the services. Common expressions associated for these remote computing resources 118 may include "on-demand computing", "software as a service (SaaS)", "platform computing", "network-accessible platform", "cloud services", "data centers", and so forth.

The servers 122(1), 122(2), . . . , 122(P) may include processor(s) 124 and memory 126, which may store or otherwise have access to some or all of the components described with reference to the memory 114 of the voice-controlled device 106. For instance, the memory 126 may have access to and utilize the speech processing module 116 for receiving audio signals from the device 106, recognizing, and differentiating between, speech and other noise and, potentially, causing an action to be performed in response. In some examples, the voice-controlled device 106 may upload audio data to the remote computing resources 118 for processing, given that the remote computing resources 118 may have a computational capacity that exceeds the computational capacity of the voice-controlled device 106. Therefore, the voice-controlled device 106 may utilize the speech processing module 116 at the remote computing resources 118 for performing relatively complex analysis on audio captured from the environment 102.

Regardless of whether the speech processing occurs locally or remotely from the environment 102, the voice-controlled device 106 may receive vocal input from the user 104 and the device 106 and/or the resources 118 may perform speech processing to interpret a user's 104 operational request or command. The requests may be for essentially any type of operation, such as transmitting audio messages. Other examples of requests include performing authentication, database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 120 via wired technologies (e.g., wires, universal serial bus (USB), fiber optic cable, etc.), wireless technologies (e.g., radio frequencies (RF), cellular, mobile telephone networks, satellite, Bluetooth®, etc.), or other connection technologies. The network 120 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

As illustrated, the memory 114 of the voice-controlled device 106 may also store or otherwise has access to the speech processing module 116, an audio player 128, a user location module 130, a user identification module 132, and one or more user profiles 134. Although not shown, in other embodiments, the speech processing module 116, the audio player 128, the user location module 130, the user identification module 132, and the one or more user profiles 134 may be maintained by, or associated with, one of the remote computing resources 118. The audio player 128 may function to output any type of content on any type of output component of the device 106. For instance, the audio player

128 may output audio via the speaker(s) 110. For instance, the user 104 may interact (e.g., audibly) with the device 106 to instruct the audio player 128 to cause output of audio.

The user location module 130 may function to identify a location of the user 104 within the environment 102 or within a larger environment. The user location module 130 may determine this location information in any suitable manner. In some examples, the device 106 has a known fixed location that is associated with the device (e.g., in the kitchen). The device 106 may use locating technologies such as global positioning systems (GPS), Wi-Fi mappings, internet protocol (IP) address, radio signals, and/or other information to determine a location of the device and/or a user of the device. For example, when the device 106 is implemented as a mobile device, then the user location module 130 may determine the position of the device as being at particular point on a map, in a particular building, at a particular event, and so forth.

The user identification module 132 may utilize one or more techniques to identify the user 104. In some instances, the user identification module 132 may work with the speech processing module 116 to determine a voice print of the user 104 and, thereafter, may identify the user 104 based on the voice print. In examples where the device 106 includes a camera, the user identification module 132 may utilize facial recognition techniques on images captured by the camera to identify the user 104. In still other examples, the device 106 may engage in a back-and-forth dialogue to identify and authenticate the user 104. Of course, while a few examples have been listed, the user identification module 132 may identify the user 104 in any other suitable manner.

After identifying the user 104, the device 106 (e.g., the user identification module 132, etc.) may reference a corresponding user profile 134 of the identified user 104 to determine how to fulfill requests received by the user. For instance, each user may maintain a different address book, messages, and preferences that are stored in the user profiles 134.

The speech processing module 116 may include additional modules to perform the various functions described above. The speech processing module 116 may include a signal processing module 136, an audio speech recognition (ASR) module 138, and a natural language understanding (NLU) module 140. The speech processing module 116 may be associated with the microphones 108 of the voice-controlled device 106 and may detect audio or other signals (e.g., electrical signals) within the environment 102.

The signal processing module 136 may perform one or more of beamforming, echo cancellation, or noise reduction. The signal processing module 136 may interpret noise and/or acoustic echo detected by the microphone(s) 108 and determine that the noise/acoustic echo is not from a target source (e.g., the user 104). Thus, the signal processing module 136 may isolate sounds from a target sources, and may further enhance these sounds. Echo cancellation may remove echo associated with an audio signal for the purpose of improving the quality of the audio signal. Noise reduction may reduce the amount of ambient noise received from the environment 102 and that is presented in the outputted audio signal. The signal processing module 136 may also perform endpointing, voice activity detection, and/or wakeword detection (e.g., detect work to "wake up" or power on the device 106, etc.).

The ASR module 138 may convert speech to text. For example, the ASR module 138 may receive the audio signals generated by the microphone(s) 108 that capture the audio. The ASR module 138 may then convert the audio signals to text, which may be further processed as discussed below. The ASR module 138 may perform the speech recognition using any existing speech-to-text conversion algorithms and/or software.

The NLU module 140 may perform natural language understanding to extract meaning and information from the text. For example, the NLU module 140 may process the text generated by the ASR module 138. The NLU module 140 may use techniques such as named entity recognition, grammars, or templates to determine that a user is requesting to send a message, the recipient(s) of the message, the contents of the message, and similar information. These pieces of information can then be further processed by a messaging module 142. As an example, the NLU module 140 may receive the following text from the ASR module 138: "send Nancy a message and ask for her address." The NLU module 140 may analyze the text to determine an intent or command (e.g., "send message"), determine named entities (also called slots), which may include recipients, the message (or payload), etc. Thus, the NLU module 140 may determine from the text that the recipient is "Nancy" and the message is "ask for her address." In some embodiments, the NLU module 140 may reformat or rearrange the message (or otherwise convert the message into another common phrasing of the message) to make it easier for the recipient understand the message, such as by reformatting the message to "Nancy, what is your address?" This reformatting may also be performed by the message module 142.

The messaging module 142 may compile a message to be transmitted to a recipient having a client device 146 and then transmit the message. As discussed above, the message module 142 may receive entities (e.g., recipients, the message, etc.) from the NLU module 140. In some embodiments, the messaging module 142 may reformat the message to make it easier for the recipient understand the message, as discussed above. The device 106 may communicate with the client device 146 via the network 120. The client device 146 may be a device that is similar to or the same as the device 106, or includes some different features such as a display and input controls. One example implementation of the client device 146 is provided below in more detail with reference to FIG. 2B. Meanwhile, the messaging module 142 may determine one or more recipients of the message based on audio received from the user and processed by the ASR module 138 and/or the NLU module 140, based on previous messages, based on contextual information, by asking the user, or by other means. The messaging module 142 may determine the contents of the message from the audio provided by the user and processed by the ASR module 138 and/or the NLU module 140. The messaging module 142 may include additional information and/or may modify the message to provide a clear and concise message, provide additional useful information (e.g., an expiration of the message, a location of the user, etc.), and/or otherwise enhance the message. When a message is received (e.g., from the client device 146), the messaging module 142 may announce the receipt of the message or provide other indicia of the message's availability. In some embodiments, the messaging module 142 may only announce messages that are for a current user when the voice-controlled device 106 is used by multiple different users (e.g., shared by a family, etc.). In some instances, the user may announce an inquiry such as "Are there messages today," which may cause the device 106 to announce a presence and/or attributes of any received messages. The messaging module 142 may play the message upon request by the user through use of the audio player 128.

In an example operation of the device 106, the messaging module 142 may provide an indication that a new message has been received, such as by announcing "new message from sender" or by providing other audio or visual indicia (e.g., blinking light, etc.). The user 104 may then utter a command, such as "play message," select an icon to initiate playing of the message, and/or otherwise initiate playing of the message. The device 106, after processing the command and interpreting the command, the device 106 may execute the command to play the audio message. Similarly, the user 104 may utter "send a message to Sally to ask her if she is available tomorrow afternoon for lunch." The speech processing module 116 (via the ASR module 138 and/or the NLU module 140) may analyze the message to determine a command (e.g., send message), a recipient (e.g., Sally), and a payload "Are you available tomorrow afternoon for lunch." The messaging module 142 may then transmit the audio message and a text version of the message to the recipient(s).

Figure 2A:
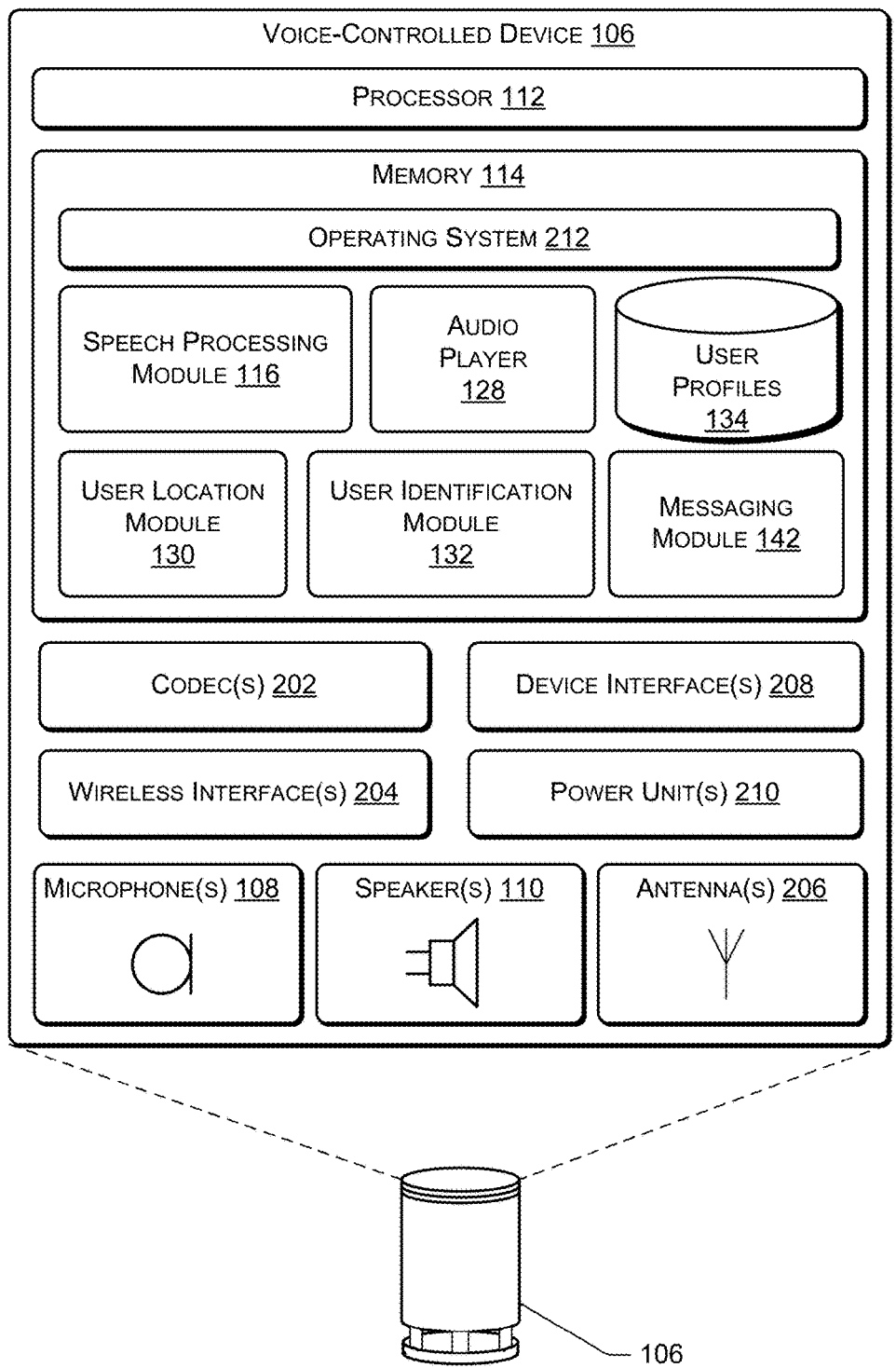
FIG. 2A is a block diagram of selected components implemented in the voice-controlled device of FIG. 1.

FIG. 2A shows selected functional components and/or modules of one implementation of the voice-controlled device 106 in more detail. Generally, the voice-controlled device 106 may be implemented as a standalone device 106 that is relatively simple in terms of functional capabilities with limited input/output components, memory 114 and processing capabilities. For instance, the voice-controlled device 106 may not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 may include the processor 112 and memory 114. The memory 114 may include computer-readable storage media ("CRSM"), which may be any available physical media accessible by the processor 112 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 may include a microphone unit that comprises microphones 108 to receive audio input, such as user voice input, a reference sound, and/or other noise. The device 106 also includes a speaker unit that includes the speaker(s) 110 to output audio sounds. One or more codecs 202 may be coupled to the microphones 108 and the speaker(s) 110 to encode and/or decode the audio signals. The codec 202 may convert audio data between analog and digital formats. A user 104 may interact with the device 106 by speaking to it, and the microphones 108 may capture sound and generate an audio signal that includes the user speech. The codec 202 may encode the user speech and transfer that audio data to other components. The device 106 can communicate back to the user 104 by emitting audible statements through the speaker(s) 110. In this manner, the user 104 interacts with the voice-controlled device 106 simply through speech, without use of a keyboard or display common to other types of devices.

In the illustrated example, the voice-controlled device 106 may include one or more wireless interfaces 204 coupled to one or more antennas 206 to facilitate a wireless connection to a network. The wireless interface 204 may implement one or more of various wireless technologies, such as Wi-Fi, Bluetooth, RF, and so on.

One or more device interfaces 208 (e.g., USB, broadband connection, etc.) may further be provided as part of the device 106 to facilitate a wired connection to a network, or a plug-in network device that communicates with other wireless networks. One or more power units 210 may further be provided to distribute power to the various components of the device 106.

The voice-controlled device 106 may be designed to support audio interactions with the user 104, in the form of receiving voice commands (e.g., words, phrase, sentences, etc.) from the user 104 and outputting audible feedback to the user 104. Accordingly, in the illustrated implementation, there are no or few haptic input devices, such as navigation buttons, keypads, joysticks, keyboards, touch screens, and the like. Further there may be no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., light emitting diodes (LEDs) around perimeter of a top portion of the device 106) to indicate a state such as, for example, when power is on or to indicate when a command is received. But, otherwise, the device 106 may not use or need to use any input devices or displays in some instances.

Several modules such as instructions, datastores, and so forth may be stored within the memory 114 and configured to execute on the processor 112. An operating system 212 may be configured to manage hardware and services (e.g., wireless unit, codec, etc.) within, and coupled to, the device 106 for the benefit of other modules.

In addition, the memory 114 may include the speech processing module 116 (including the signal processing module 136, the ASR module 138 and the NLU module 140), the audio player 128, the user location module 130, the user identification module 132 and the user profiles 134. Also as discussed above, some or all of these engines, data stores, modules, and components may reside additionally or alternatively at the remote computing resources 118, described with reference to FIG. 1.

In other implementations, the device 106 may be implemented in a vehicle, in wearable items such as glasses or a watch, or in other shapes and forms. The device 106 may also be implemented as a mobile telephone (e.g., a smart phone, etc.), tablet, or other portable multi-functional device that includes at least some of the components discussed above. In the following figure, an illustrative example of the client device 146 is provided in detail, which may be an implementation of the device 106. The messaging module 142 may be packaged as a downloadable application that can be installed on various types of mobile telephones that run different types of operating systems such as iOS® and Android®.

Figure 2B:
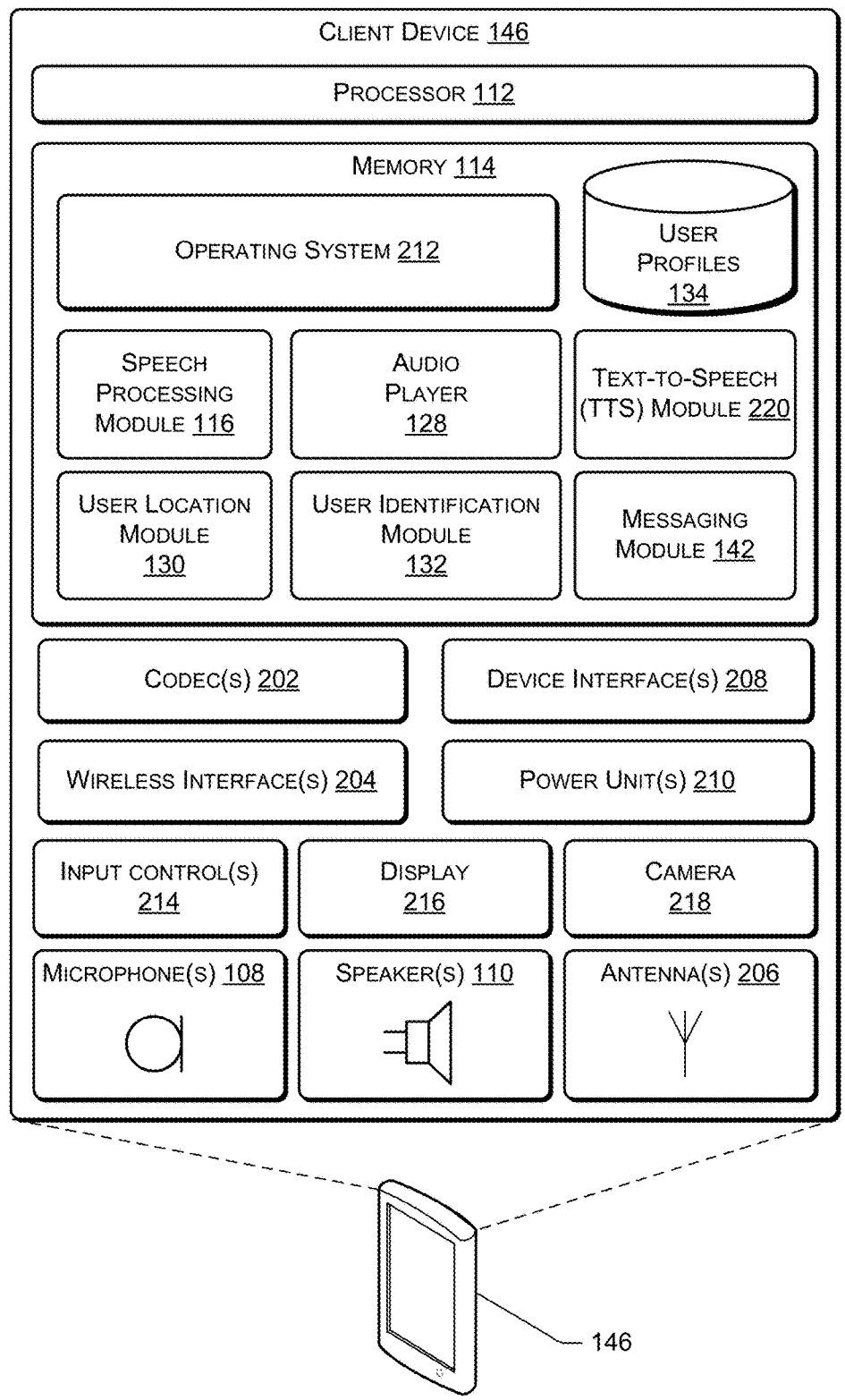
FIG. 2B is a block diagram of selected components implemented in the client device of FIG. 1.

FIG. 2B shows selected functional components and/or modules of one implementation of the client device 146 in more detail. As noted above, the client device 146 maybe an implementation of the voice-controlled device 106. Thus, as shown in FIG. 2B, the client device 146 includes many of the same components as described above with respect to the voice-controlled device 106. However, unlike the voice-controlled device 106 discussed with reference to FIG. 2A, the client device 146 may include a physical or virtual keyboard, keypad, or other form of mechanical or software (e.g., touch, etc.) input in some implementations, and may include a display or touch screen to facilitate visual presentation and possibly user touch input. The client device 146 may be implemented with the ability to receive and output audio, a network interface (wireless or wire-based), power, and limited processing/memory capabilities. An example of the client device 146 is a mobile telephone (also called a smart phone), which can process custom or special software to perform the functions discussed herein.

In the illustrated implementation, the client device 146 may include the processor 112 and memory 114. The client device 146 may include microphone 108 to receive audio input, such as user voice input, a reference sound, and/or other noise. The client device 146 also includes a speaker unit that includes the speaker(s) 110 to output audio sounds. The codecs 202 may be coupled to the microphones 108 and the speaker(s) 110 to encode and/or decode the audio signals. The client device 146 can communicate back to the user 104 by emitting audible statements through the speaker(s) 110. In this manner, the user 104 may interact with the client device 146 simply through speech, without use of input controls 214 such as a keyboard or display common to other types of devices. However, the user may also interact with the client device 146 by inputting information or commands via the input control(s) 214, viewing information made visible by a display 216, capturing images with a camera 218, and so forth. The client device 146 may include the wireless interfaces 204 coupled to the antennas 206 to facilitate a wireless connection to a network. The device interfaces 208 (e.g., USB, broadband connection, etc.) may further be provided as part of the client device 146 to facilitate a wired connection to a network, or a plug-in network device that communicates with other wireless networks. The power units 210 may further be provided to distribute power to the various components of the client device 146.

The client device 146 may be designed to support text, visual, and/or audio interactions with the user 104, in the form of receiving text commands and/or voice commands (e.g., words, phrase, sentences, etc.) from the user 104 and outputting feedback to the user 104.

Several modules such as instructions, datastores, and so forth may be stored within the memory 114 and configured to execute on the processor 112. The operating system 212 may be configured to manage hardware and services (e.g., wireless unit, codec, etc.) within, and coupled to, the client device 146 for the benefit of other modules.

In addition, the memory 114 may include the speech processing module 116 (including the signal processing module 136, the ASR module 138 and the NLU module 140), the audio player 128, the user location module 130, the user identification module 132, the user profiles 134, and a text to speech (TTS) module 220. The TTS module 220 may perform the text-to-speech conversion using any existing algorithms and/or software. In some embodiments, the TTS module 220 may use custom voice profiles that are associated with users and possibly stored or referenced in the user profiles 134. The customer voice profiles may allow the TTS module 220 to generate speech that sounds similar to a particular user's voice. The TTS module 220 may use the custom voice profiles when modifying or adding content, such as reformatting a phrase "Ask Nancy for her address" to "Nancy, what is your address?"

As discussed above, some or all of these engines, data stores, modules, and components may reside additionally or alternatively at the remote computing resources 118, described with reference to FIG. 1. Thus, the remote computing servers 118 may include any combination of the engines, data stores, modules, and components shown and described with reference to FIGS. 1, 2A, and 2B.

When an audio-based device, as described with reference to FIG. 2A communicates to a text-enabled device, as described with reference to FIG. 2B (because the device has text input features and a display), then the following types of events may occur. An audio message captured by the audio-based device may be converted to text using the ASR module 138 to make the message readable on the text-enabled device. A text message generated on the text-enable device may be converted to audio using the TTS module 220 to make the message capable of play by the audio-based device.

FIGS. 3, 5, 6, 7A, and 7B show illustrative processes illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

Figure 3:
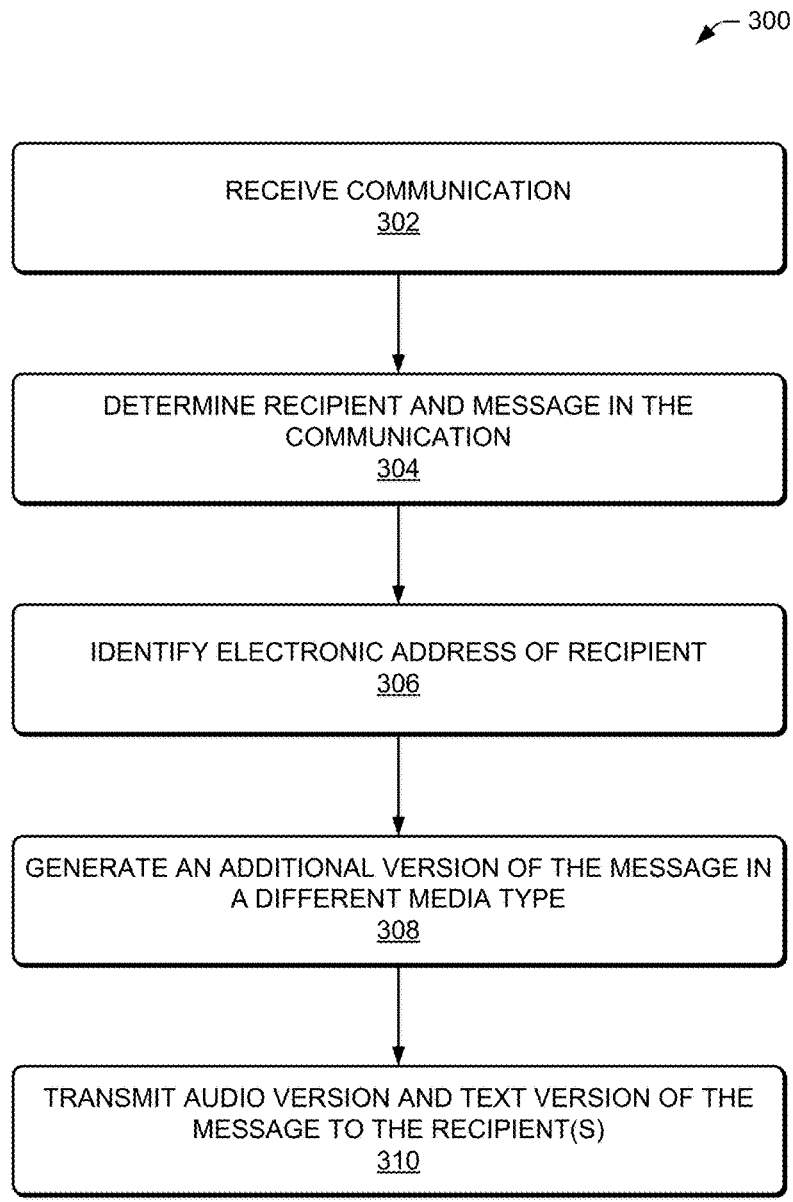
FIG. 3 is a flow diagram of an illustrative process to perform asynchronous audio messaging.

FIG. 3 is a flow diagram of an illustrative process 300 to perform asynchronous audio messaging. The voice-controlled device 106, the remote computing resources 118, other computing devices or a combination thereof may perform some or all of the operations described below.

At 302, a communication may be received, such as by receiving captured audio that is spoken by a user. However, the communication may also be in the form of a text message. The receipt may occur in response to detection of the user's voice, after detection of a predefined command (e.g., "Awake", etc.), and/or after another trigger, such as activation of a selection from a haptic input component (e.g., pressing a button).

At 304, the speech-processing engine 116 may perform speech recognition and/or natural language understanding on the received communication to determine a recipient and message in the communication. The NLU module 140 may perform an analysis of the communication to identify a command, one or more recipients, and/or a payload or body of a message. For example, the NLU module 140 may determine the command and identify that the communication is to be processed by the messaging module 142 to send an audio message to a recipient. In some embodiments, the trigger (e.g., input via the haptic input component, occurrence of audio, etc.) may indicate that the communication is to be processed by the messaging module 142. In some embodiments, the recipient of the message may be determined from a previous message or from contextual information associated with the message (e.g., information on a user interface, etc.).

The message may be determined by analysis of the text, which may be a natural language instruction. For example, the user may say "send Nancy a message and ask for her address." The NLU module 140 may determine the recipient is Nancy based on a match from a lookup operation using the address book of contacts. The NLU module 142 may analyze the text to determine the message includes "ask for her address." The messaging module 142 may truncate the audio to create an audio message that omits the command and recipients. Thus, the messaging module 142 may receive the audio as text from the ASR module 138 and may then determine recipients and a message to send to the recipients using the NLU module 140. In some instances, the message may be separated by a command word, which may allow the NLU module 140 to easily identify the message, e.g., "Send Nancy a message . . . What is your address," where the term "message" is a command that indicates the start of the payload or message (e.g., start of truncation, etc.).

At 306, electronic addresses for each recipient may be obtained using an address book or other lookup table, possibly stored in the user profiles 134. The particular user generating the request may also be determined by comparing a voice profile to known voice profiles stored in the user profiles 134 or by other known processes (e.g., use of a device identifier, etc.).

At 308, the messaging module 142 may generate an additional version of the message in a different media type (e.g., convert audio to text or convert text to audio). An audio version may be a portion of the audio captured by the microphone(s) 108 (e.g., truncated version). Thus, when the user states "send Nancy a message . . . What is your address" to create the audio, the messaging module 142 may create an audio message that includes the user speaking "what is your address" and text that includes the words "what is your address." When the user types "What is Nancy's address", the messaging module 142 or the NLU module 140 may convert the text to "Nancy, what is your address," and then the TTS module may create audio that speaks "Nancy, what is your address."

At 310, the messaging module 142 may transmit the audio version and the text version of the message to the recipient or recipients identified in at the operation 306.

Figure 4:
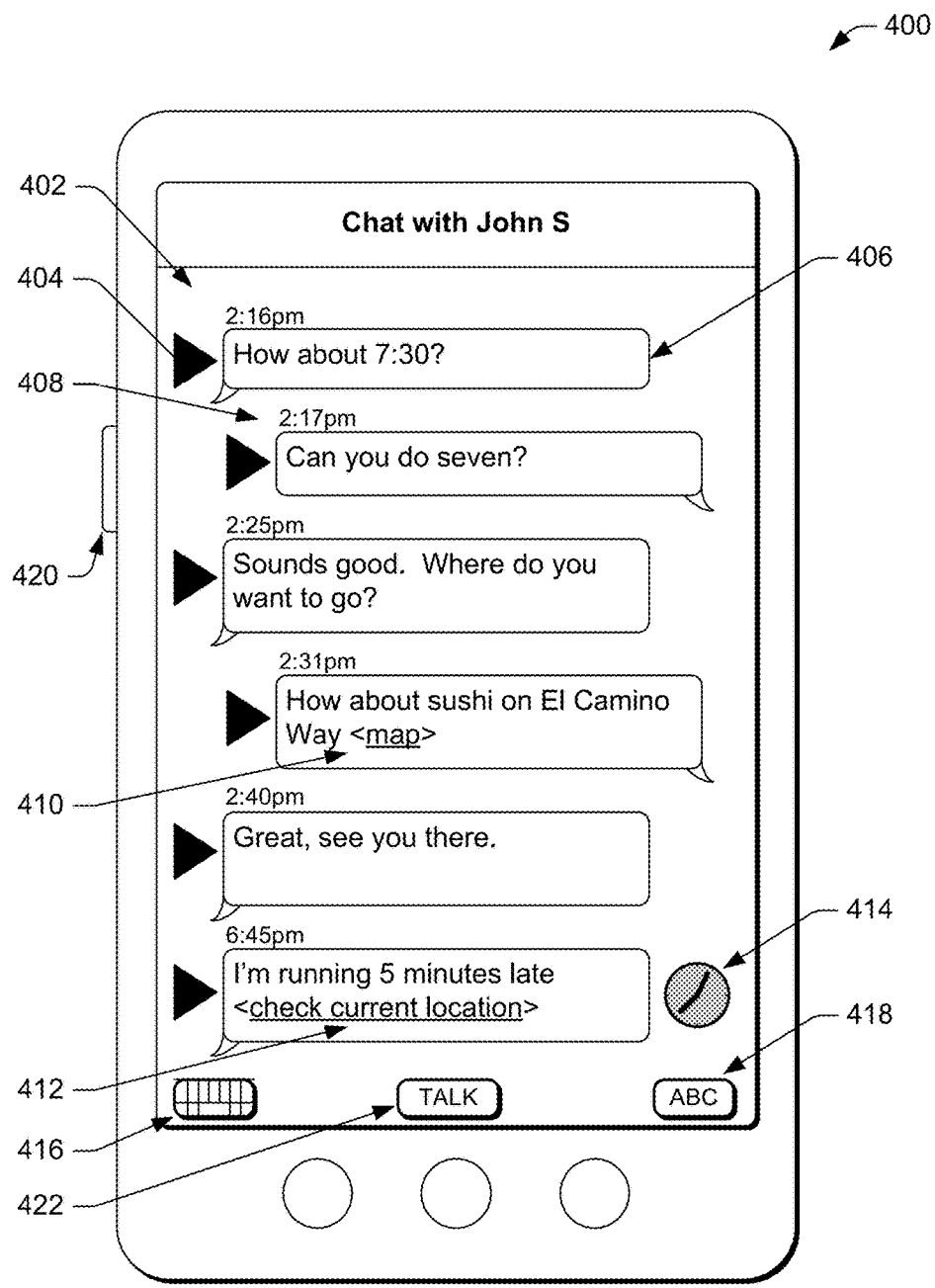
FIG. 4 shows an illustrative user interface that provides access to audio message and corresponding text messages from an asynchronous audio messaging system.

FIG. 4 shows an illustrative user interface (UI) 400 that provides access to audio message and corresponding text messages from an asynchronous audio messaging system. The UI 400 is shown as being presented by a mobile telephone; however, the UI 400 may be presented by any device that includes a display.

The UI 400 may include a chain of messages 402 that include an audio version 404 (indicated on the UI 400 by a play selector) and a text version 406 of the message. The message may also include a time stamp 408, an indication of an origin of the message (e.g., based on alignment of the message, colors, and/or other features). In some embodiments, the messages may include additional information, such as location information that may include an entity location 410 specified in a message, a user location 412 of a user in the conversation, or other location information. In various embodiments, the messages may also include at least one indicator 414. The indicator 414 may indicate an expiration of a message, an urgency of the message, a priority of the message, and/or other relevant information about the message. In some instances, the indicator 414 may be communicated by a presentation style of the message (font, color, etc.), an icon/image, an animated icon/image, or other types of graphical indicators.

The UI 400 may include a keyboard command 416 to enable a user to access a keyboard to reply with a text message rather than by generating an audio message (as described in the process 300). The UI 400 may include a "hide/show text" command 418 to enable the user to hide or show text (transcriptions).

In some embodiments, the device may include a physical control 420 (e.g., a button, etc.) and/or the UI 400 may include a software control 422 that when activated, initiates recording/capturing a message. Thus, the controls 420, 422 may be "push to talk" controls that when selected by the user, initiate recording or capturing audio spoken by the user. The recording/capturing be occur while the controls 420, 422 are selected or after selection of the controls 420, 422.

In various embodiments, the determination of the recipient may be determined based on the UI 400. For example, when a user is exchanging messages with another user named "John S", the messaging module 142 may determine the recipient is John S because the user sends a message from the UI that indicates the recipient as being John S. However, when the device does not include a UI, such as the voice-controlled device 106 shown in FIG. 2A, then the NLU module 140 may have to infer the name of recipient using other contextual information. For example, if the user instructs the device 106 to "tell him I'm running 10 minutes late," and the device just played a message from John S, then the NLU module 140 may infer the recipient is the user named John S. Other contextual information may be used.

Figure 5:
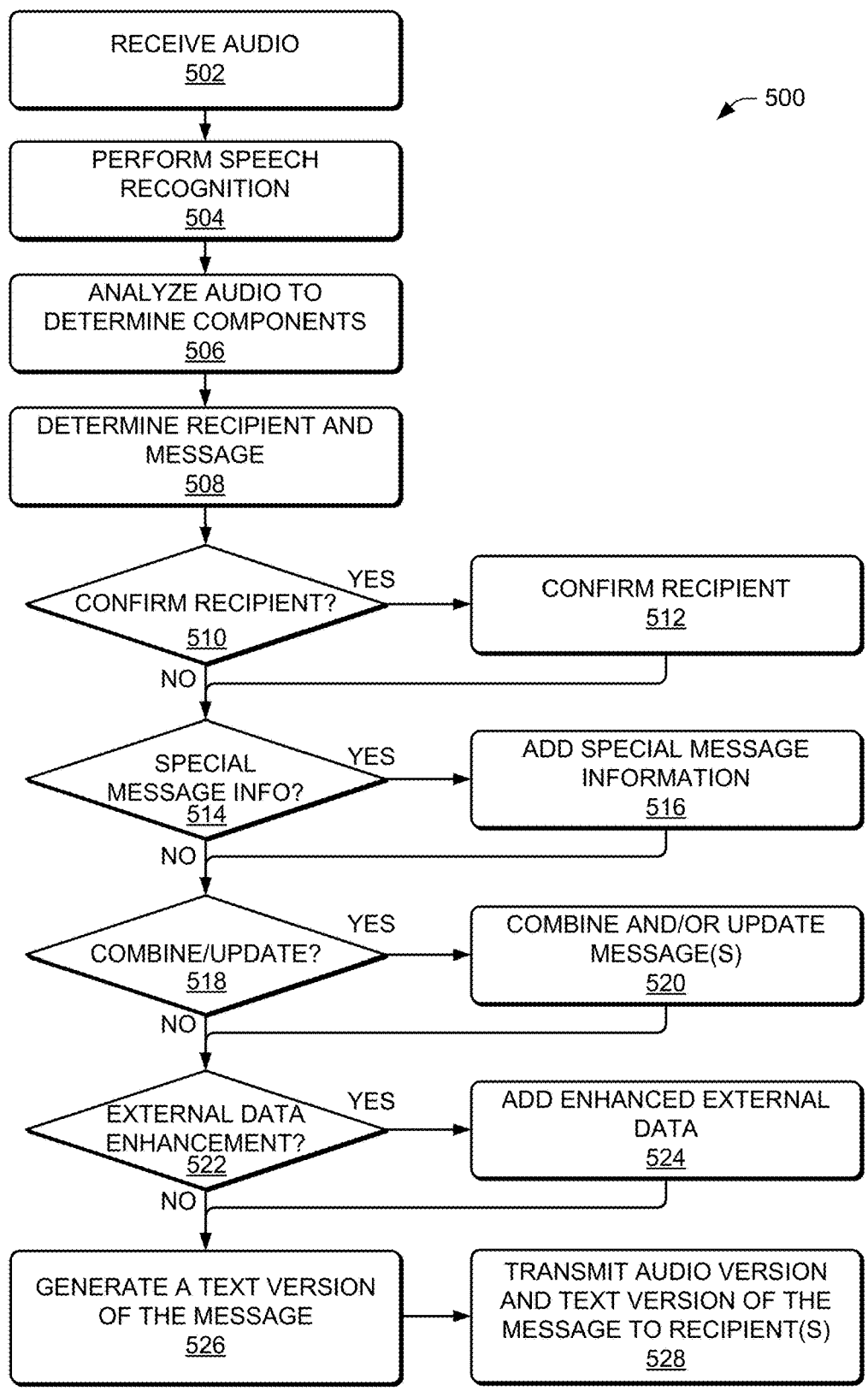
FIG. 5 is a flow diagram of an illustrative process to perform enhanced asynchronous audio messages that include instructions and/or content inferred from an analysis of contextual information.

FIG. 5 is a flow diagram of an illustrative process 500 to perform enhanced asynchronous audio messages that include instructions and/or content inferred from an analysis of contextual information. The voice-controlled device 106, the remote computing resources 118, other computing devices or a combination thereof may perform some or all of the operations described below.

At 502, the microphone(s) 108 may capture audio that is spoken by a user. The operation 502 may be the same or similar as the operation 302 of the process 300.

At 504, the speech processing module 116 may perform speech recognition on the received audio. The operation 504 may be the same or similar as the operation 304 of the process 300. Thus, at 504, the speech processing module 116 may perform a high level analysis of the audio and/or convert at least a portion of the audio to text.

At 506, the messaging module 506 may analyze the audio to determine components of the audio. The components may include a command to generate a message, one or more recipients, a payload, and/or other information that is included in the audio (e.g., an expiration, a location, etc.), which are described in greater detail below.

At 508, the messaging module 508 may determine one or more recipients and a message from the audio. The operation 508 may be the same or similar as the operation 306 of the process 300. In some embodiments, the recipient may not be specified in the audio. For example, when a user is exchanging audio messages with another person (recipient), then the user may not say the recipient's name in each audio received at the operation 502. Thus, the messaging module 508 may infer the recipient based on a context of the message, a previous message transmitted or received, and/or other information.

At 510, the messaging module 142 may confirm the recipient. For example, when the audio does not include the recipient and the context does not include a clear recipient of the message, the messaging module may confirm the recipient. In some instances, the messaging module 142 may confirm the recipient when multiple electronic addresses are available for the recipient. Through the confirmation, the user may provide corrected recipients or corrected electronic addresses. When the recipient confirmation is triggered (following the "yes" route from the decision operation 510), then the process 500 may advance to an operation 512 to confirm the recipient, an electronic address of the recipient, or both. The operation 512 may perform a loop to determine the recipient(s) and/or electronic address(es) to enable transmission of the message. When the recipient confirmation is not triggered (following the "no" route from the decision operation 510) or following the operation 512, then the process 500 may advance to an operation 514.

At 514, the messaging module 142 may determine whether special message information is available in the audio and/or can be added to the message or metadata of the message. The special message information may include an expiration time, an urgency, a code, and/or other types of indicia included in the audio and/or discoverable using contextual information. For example, the user may generate a message that says "I'm at the grocery store, let me know if you need anything." The messaging module 142 may determine that this message may expire after a certain amount of time and become at least partially irrelevant to the recipient since the sender will leave the grocery store at some foreseeable time after creating the audio. The expiration may be determined from information in the audio (e.g., I'll be here for 15 more minutes", etc.), from contextual data (normal visit to the grocery store is 45 minutes, thus expiration is 45 minutes from creation of the audio, etc.), default expirations (e.g., 30 minutes, 1 hour, etc.), or other values. The messaging module 142 may determine an urgency for these types of messages (e.g., determine to code them as urgent, important, etc.) with or without an explicit indication or instruction by the user that creates the audio. The messaging module 142 may create an icon/image or animated icon/image to communicate the special information. When the special message information is triggered (following the "yes" route from the decision operation 514), then the process 500 may advance to an operation 516 to add the special message information. When the special message information is not triggered (following the "no" route from the decision operation 514) or following the operation 516, then the process 500 may advance to an operation 518.

At 518, the messaging module 142 may determine whether to combine a message with another message or update a message. For example, the messaging module may combine a message with another message when a second message is determined to be part of a first message (a subsequent message). The messaging module 142 may determine that the second message is part of the first message based on the context of the messages. For example, when the user records audio for a first message and then pauses while thinking about something, the messaging module 142 may transmit the first message to the recipient. However, the user may later continue the message by speaking more and creating another audio. The second audio may be analyzed and determined to be part of the first audio. The messaging module 142 may then combine this audio with the first audio, such as by combining the messages into a single message and/or deleting the first message (e.g., via a recall, etc.) and transmitting a second complete message.

At 518, the messaging module may also update a message based on the content in the message. For example, when the user creates an audio that states "I'll be at the grocery store for 25 more minutes", then the messaging module may cause the message to be updated to count down the remaining time that the senders is at the grocery store. The messaging module may update the user's voice with a computer generated voice to modify the original message or may use previous recordings of the user's voice to update the message. For example, after ten minutes has passed and the recipient plays the message, the message may state "I'll be at the grocery store for 15 more minutes." The expiration may be communicated to the recipient using an icon or animation, such as the indicator 414 shown in FIG. 4. Other types of updates may include correcting a message, updating a location, recalling a message, and/or making other modifications to a previous message. When the combine/update is triggered (following the "yes" route from the decision operation 518), then the process 500 may advance to an operation 520 to combine/update the message. When the combine/update is not triggered (following the "no" route from the decision operation 518) or following the operation 520, then the process 500 may advance to an operation 522.

At 522, the messaging module 142 may determine whether to add an external data enhancement to the message or to metadata of the message. The external data enhancement may leverage information obtained by the remote computing resources 118. For example, the external data enhancement may include a link to a map that locates the user (sender) or a map that locates a place specified in a message (e.g., the entity location 410, the user location 412, etc.), or other types of information that can supplement information in the message. When the external data enhancement is triggered (following the "yes" route from the decision operation 522), then the process 500 may advance to an operation 524 to generate the external data enhancement for the message. In some instances, the messaging module 142 may transmit updates to the supplemental information (such as an updated location of the user) to the electronic address of the recipient for association with the message without input by the user (automatically). When the external data enhancement is not triggered (following the "no" route from the decision operation 522) or following the operation 524, then the process 500 may advance to an operation 526.

At 526, the messaging module 142 may generate an audio version and a text version of the message. The operation 526 may be the same or similar as the operation 308 of the process 300.

At 528, the messaging module 142 may transmit the audio version and the text version of the message to the recipient or recipients identified in at the operation 508 and/or the operation 512.

Figure 6:
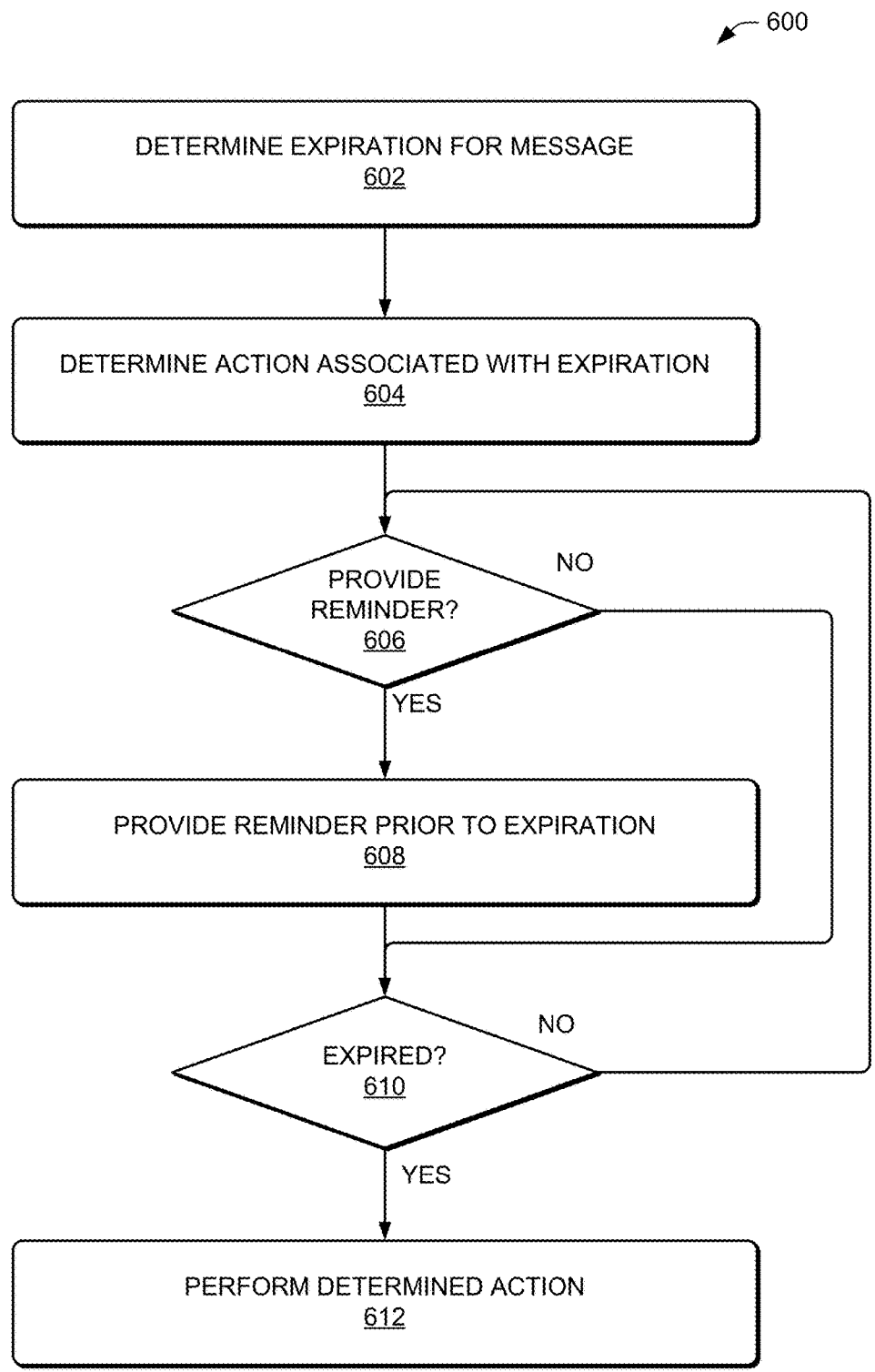
FIG. 6 is a flow diagram of an illustrative process to manage an expired message prior to and/or after expiration of the message.

FIG. 6 is a flow diagram of an illustrative process 600 to manage an expired message prior to and/or after expiration of the message. The voice-controlled device 106, the remote computing resources 118, other computing devices or a combination thereof may perform some or all of the operations described below.

At 602, the messaging module 142 may determine an expiration for a message. The expiration may be determined at the operation 516 in the process 500 by the device 106 that sends the message and/or by device that receives the message.

At 604, the messaging module 142 may determine one or more action(s) associated with the expiration. The action(s) may include updating the message over time, deleting the message, recalling the message, and/or performing other actions associated with the message (e.g., changing a color or attribute of the message, etc.).

At 606, the messaging module 142 may determine whether to provide a reminder to the recipient about the message prior to the expiration of the message. The reminder may be another message transmitted by the device associated with the user or an indication provided by the device of the recipient, such as when the message has not been opened, played, or otherwise accessed by the recipient. When the messaging module 142 determines to provide the reminder (following the "yes" route from the decision operation 606), then the process 600 may advance to an operation 608.

At 608, the messaging module may provide the reminder prior to the expiration of the message. As discussed above, the reminder may be another message sent by the device associated with the user or may be an indication generated by a device associated with the recipient. When the messaging module 142 determines not to provide the reminder (following the "no" route from the decision operation 606) or following the operation 608, then the process 600 may advance to a decision operation 610.

At 610, the messaging module 142 may determine whether the message is expired. When the messaging module 142 determines that the message is expired (following the "yes" route from the decision operation 610), then the process 600 may advance to an operation 612. When the messaging module 142 determines that the message is not expired (following the "no" route from the decision operation 610), then the process 600 may advance to the decision operation 606 and perform a loop.

At 612, the messaging module 142 may perform the action determined at the operation 604. The actions may include updating the message over time, deleting the message, recalling the message, and/or performing other actions associated with the message (e.g., changing a color or attribute of the message, etc.).

Figure 7A:
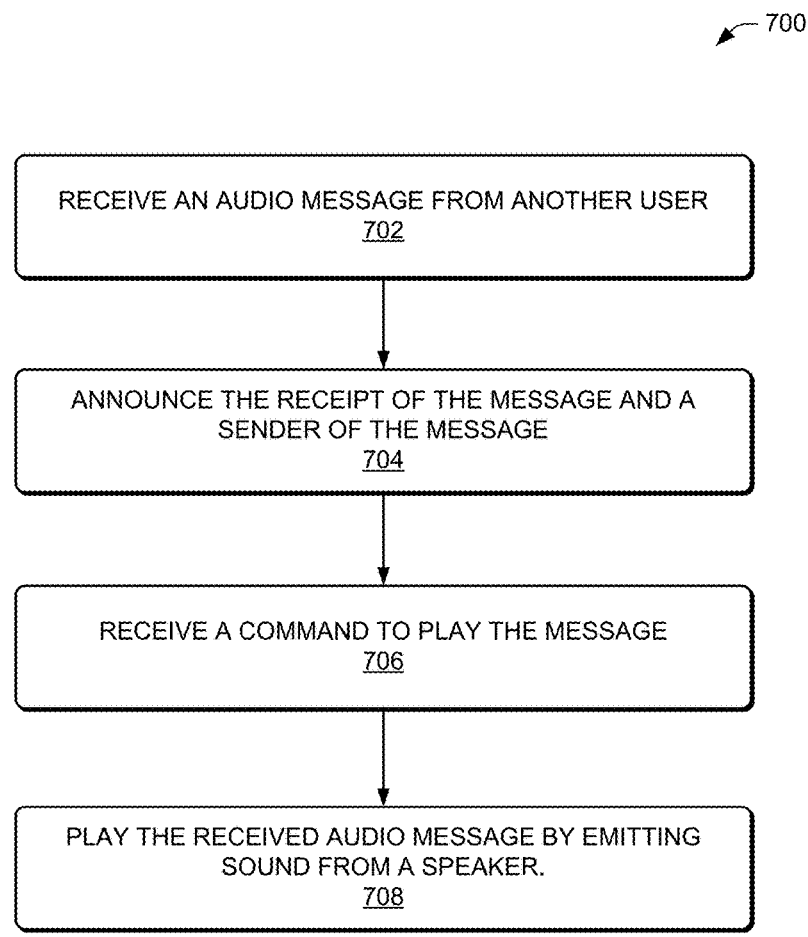
FIG. 7A is a flow diagram of an illustrative process to receive an audio message and play the audio message in response to a user request.

FIG. 7A is a flow diagram of an illustrative process 700 to receive an audio message and play the audio message in response to a user request. The voice-controlled device 106, the remote computing resources 118, other computing devices or a combination thereof may perform some or all of the operations described below.

At 702, the messaging module 142 may receive an audio message from another user.

At 704, the messaging module 142 may announce the receipt of the audio message. The announcement may include a sender of the message and/or other details about the message. For example, the announcement may include an expiration of the message, an urgency of the message, location information associated with the message, and/or other information associated with the message.

In some embodiments, the messaging module will determine whether or not to announce the message based on the user or users detected to be interacting with the voice-controlled device 106. For example, when a user "Jane" is interacting with the voice-controlled device 106, then the messaging module 142 may announce received message for Jane and not other users. When a message for another user "Sam" is received, the messaging module may not announce the message until Sam is detected as using the voice-controlled device 106.

At 706, the messaging module may receive a command a play the message.

At 708, in response to receipt of the command, the messaging module 142 may play the received audio message. For example, the messaging module 142 may cause the audio player 128 to play the message by emitting sound from a speaker. In some instances, the messaging module 142 may include (play) other information such as special message information, external data enhancements, or other information included in the message or in metadata of the message.

Figure 7B:
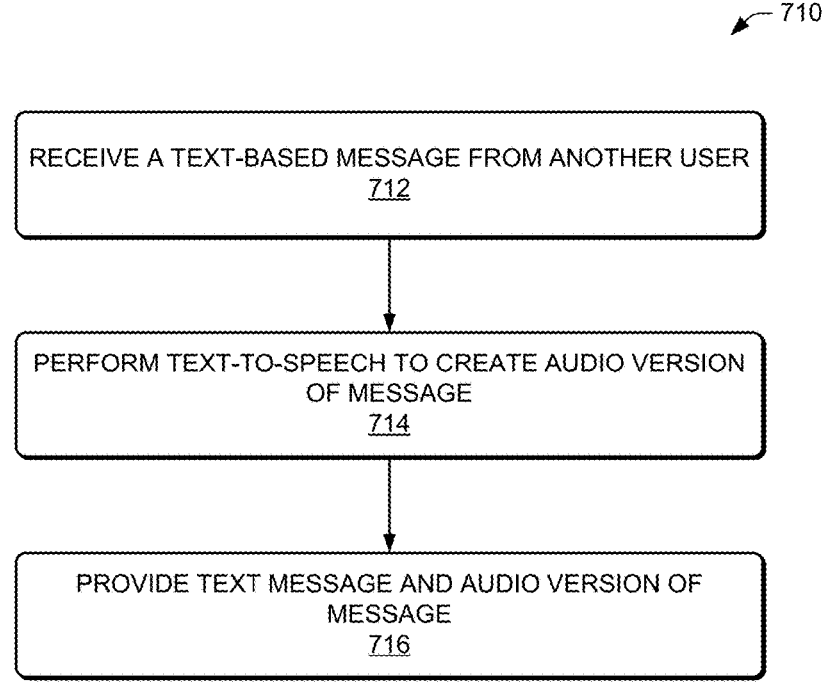
FIG. 7B is a flow diagram of an illustrative process to receive a text-based message, create an audio version of the text-based message and provide the text-based message and the audio message for access by a user.

FIG. 7B is a flow diagram of an illustrative process 710 to receive a text-based message, create an audio version of the text-based message, and provide the text-based message and the audio message to a client device and/or for display by a user of the client device. The process 710 may be performed by the client device 146, such as the by the implementation shown and described with reference to FIG. 2B. The process 710 may also be performed by the remote computing resources 118 described with reference to FIG. 1.

At 712, a text-based message may be received from another device. For example, another user may create the text-based message through data input via a keyboard, and then may send the message to a recipient.

At 714, the TTS module 220 may perform a text-to-speech conversion of the message to create an audio version of the message. The text-to-speech conversion may be performed by the client device 146, the remote computing resources 118, or both.

At 716, the text-based message and the audio version of the message may be provided for eventual access by the recipient of the message. The client device 146 may present the message as a text message and may include a selector to access the audio version of the message in a user interface (UI), such as in the UI 400 shown and described with reference to FIG. 4.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
one or more processors; and
one or more memories coupled to the one or more processors, the one or more memories including instructions that upon execution cause the system to:
receive a first audio signal that includes a representation of words spoken by a user;
generate a first text by performing speech recognition on the first audio signal;
analyze the first text to determine that the first audio signal includes a message to be sent to a recipient;
truncate the first text and the first audio signal to create a second text and a second audio signal as the message to be transmitted to the recipient, wherein truncation to create the second audio signal includes removing a representation of a first portion of the words spoken by the user while retaining a representation of a second portion of the words spoken by the user as the second audio signal;
determine a user profile associated with the user, wherein the user profile is one of a plurality of user profiles;
determine, from plurality of recipients different from the user, the recipient of the message based at least in part on the user profile;
determine an electronic address associated with the recipient of the message;

determine an expiration time associated with the second audio signal based at least in part on an analysis of the first audio signal;
transmit the second audio signal and the second text to the electronic address; and
transmit the expiration time to the electronic address as metadata associated with the second audio signal to update at least a portion of the second audio signal based at least in part on the expiration time of the second audio signal.

2. The system as recited in claim 1, wherein determination of the recipient of the message includes determining the recipient from a previous message or determining the recipient from contextual information associated with the message.

3. The system as recited in claim 1, wherein the instructions, upon further execution, cause the system to:
receive a third audio signal from another user device;
generate a third text by performing speech recognition on the third audio signal;
truncate the third text and the third audio signal to create a fourth text and a fourth audio signal; and
cause a device associated with the user to announce availability of at least one of the fourth audio signal or the fourth text.

4. The system as recited in claim 1, wherein the first portion of the words spoken by the user includes at least one of a command associated with the message or the recipient associated with the message.

5. The system as recited in claim 1, wherein the truncation of the first text and the first audio signal to create the second text and the second audio signal as the message includes using a natural language understanding algorithm to determine to remove a representation of the first portion of the words spoken by the user.

6. A computer-implemented method comprising: under control of one or more computing devices executing instructions,
receiving a first audio signal, at least a portion of the first audio signal representing words spoken by a user;
performing at least one of automatic speech recognition or natural language understanding on the at least a portion of the first audio signal to determine first text based at least in part on the words spoken by the user;
creating a second audio signal based at least in part on the first audio signal, at least a portion of the second audio signal representing audio corresponding to at least a portion of the words spoken by the user from the first audio signal;
creating a message associated with the second audio signal, the message including second text corresponding to the at least the portion of the words spoken by the user;
determining a user profile associated with the user, the user profile being one of a plurality of user profiles associated with a device located in a user environment;
determining, from a plurality of recipients different from the user, a recipient based at least in part on the user profile;
determining an expiration time associated with the second audio signal based at least in part on an analysis of the first audio signal;
transmitting the second audio signal and the message to an address associated with the recipient; and
transmitting the expiration time to the address as metadata associated with the second audio signal.

7. The computer-implemented method as recited in claim 6, wherein the at least the portion of the words spoken by the user is a first portion of the words spoken by the user, the computer-implemented method further comprising truncating the first audio signal to remove a representation of a second portion of the words spoken by the user while preserving a representation of the first portion of the words spoken by the user.

8. The computer-implemented method as recited in claim 6, further comprising determining, from the first audio signal, a command to transmit the message to the recipient, and wherein the message includes the at least the portion of the words spoken by the user and represented in the second audio signal.

9. The computer-implemented method as recited in claim 6, further comprising determining the recipient of the second audio signal based at least in part on a previous message or based at least in part on contextual information associated with the first audio signal.

10. The computer-implemented method as recited in claim 6, further comprising:
receiving a third audio signal from the user;
determining that the third audio signal is associated with the first audio signal; and
generating a fourth audio signal including at least a portion of the third audio signal and at least a portion of the second audio signal.

11. The computer-implemented method as recited in claim 6, further comprising:
determining the recipient of the second audio signal;
determining, from an address book storing the plurality of recipients, a preferred address associated with the recipient of the second audio signal; and
using the preferred address as the address for the recipient.

12. One or more non-transitory computer-readable media storing computer-executable instructions that, when executed by one or more processors, cause the one or more processors to:
receive a first audio signal that includes a representation of words spoken by a user;
perform at least one of automatic speech recognition or natural language understanding on at least a portion of the first audio signal to determine first text based at least in part on the representation of the words spoken by the user;
create a second audio signal based at least in part on the first audio signal, the second audio signal including a representation of audio corresponding to at least a portion of the words spoken by the user from the first audio signal;
create a message associated with the second audio signal, the message including second text corresponding to the representation of the at least the portion of the words spoken by the user;
determine a user profile associated with the user, wherein the user profile is one of a plurality of user profiles;
determine, from a plurality of recipients different from the user, a recipient, wherein the recipient is based at least in part on the user profile;
determine an address associated with the recipient;
determine an expiration time of the second audio signal based at least in part on an analysis of the first audio signal;
transmit the second audio signal and the message to the address associated with the recipient; and transmit the expiration time to the address as metadata associated with the second audio signal.

13. The one or more non-transitory computer-readable media as recited in claim 12, wherein creating the second audio signal includes removing at least one of an identification of the recipient or a command from representation of the words spoken by the user.

14. The one or more non-transitory computer-readable media as recited in claim 12, wherein the at least the portion of the words spoken by the user is a first portion of the words spoken by the user, and wherein creating the second audio signal includes truncating the first audio signal to remove a representation of a second portion of the words spoken by the user while preserving a representation of the first portion of the words spoken by the user.

15. The one or more non-transitory computer-readable media as recited in claim 12, wherein generating the message includes using a speech-to-text algorithm to create a text-based message as the message.

16. The one or more non-transitory computer-readable media as recited in claim 12, wherein the instructions, when executed by the one or more processors, cause the one or more processors to:
   determine a first location of the user;
   transmit the first location of the user to the address for association with the second audio signal;
   determine a second location of the user that is different than the first location; and
   transmit, without input by the user, the second location to the address in association with the second audio signal based on the second location being different than the first location.

17. The computer-implemented method of claim 6, further comprising determining the user profile associated with the user based at least in part on the first audio signal.

18. The computer-implemented method of claim 6, further comprising determining the user profile associated with the user based at least in part on a device identifier associated with the device located in the user environment.

19. The one or more non-transitory computer-readable media as recited in claim 12, wherein the instructions, when executed by the one or more processors, cause the one or more processors to perform voice recognition on the first audio signal or the second audio signal to determine the user profile associated with the user.

20. The computer-implemented method as recited in claim 6, wherein an individual recipient of the plurality of recipients represents an individual user different from the user, and wherein a plurality of electronic addresses is associated with the individual recipient.

21. The computer-implemented method as recited in claim 6, further comprising determining the expiration time based at least in part on a contextual data associated with the first audio signal.

22. The one or more non-transitory computer-readable media as recited in claim 12, wherein the metadata is first metadata, and wherein the instructions, when executed by the one or more processors, cause the one or more processors to transmit second metadata to the address to provide a visual indication based at least in part on the expiration time of the second audio signal.

* * * * *